United States Patent [19]

Yamashita

[11] 4,091,302
[45] May 23, 1978

[54] PORTABLE PIEZOELECTRIC ELECTRIC GENERATING DEVICE

[76] Inventor: Shiro Yamashita, 6-31-1, Kameido, Koto-ku, Tokyo, Japan

[21] Appl. No.: 788,015

[22] Filed: Apr. 15, 1977

[30] Foreign Application Priority Data

Apr. 16, 1976 Japan .................................. 51-43902

[51] Int. Cl.$^2$ .......................................... H01L 41/10
[52] U.S. Cl. ................................ 310/339; 58/23 BA
[58] Field of Search ...................... 310/328, 329, 339; 58/23 BA, 41 B, 82 A, 46, 116 R, 28 R, 28 D, 23 R

[56] References Cited

U.S. PATENT DOCUMENTS

| | | | |
|---|---|---|---|
| 1,884,547 | 10/1932 | Bower | 310/339 X |
| 2,791,732 | 5/1957 | Jones | 58/23 BA |
| 2,921,252 | 1/1960 | Schiavone | 310/339 X |
| 3,174,419 | 3/1965 | Sable | 310/339 X |
| 3,613,351 | 10/1971 | Walton | 58/23 BA |

Primary Examiner—Mark O. Budd
Attorney, Agent, or Firm—Robert E. Burns; Emmanuel J. Lobato; Bruce L. Adams

[57] ABSTRACT

A portable electric generating device particularly for an electronic timepiece comprises an oscillatable weight rotatably supported for rotation in either direction by changes in position of the device, rotation converting means for converting oscillation of the oscillatable weight into rotation in one direction and a rotatably energy storing wheel comprising a hub portion driven by the rotation converting means, a coaxial rim portion having on its periphery a plurality of circumferentially spaced teeth and springs connecting the hub portion with the rim portion. A pallet engageable with the teeth restrains rotation of the rim portion of the energy storing wheel until predetermined energy has been stored in the springs whereupon the rim portion of the energy storing wheel is rotated by the springs until again stopped by the pallet. Operation of the pallet is controlled by a cam wheel driven by the rotation converting means. Piezoelectric elements are mounted on the pawls of the pallet in a position to be struck by the teeth of the energy storing wheel whereby electric energy is generated. The piezoelectric elements are connected through a rectifier to a secondary cell and to output terminals of the generating device. Alternatively, a piezoelectric element is mounted in position to be struck by a projecting portion provided on the pallet.

13 Claims, 8 Drawing Figures

PORTABLE PIEZOELECTRIC ELECTRIC GENERATING DEVICE

FIELD OF INVENTION

The present invention relates to a portable electric generating device and particularly to an electric generator for charging a secondary cell which serves as the power supply of an electronic timepiece.

BACKGROUND OF THE INVENTION

In general portable electronic devices such as electronic timepieces have used silver cells, mercury cells, etc. which serve as the power source. Such cells make the above mentioned timepieces operate during a predetermined period of time. However, such cells need to be exchanged regularly in order to provide continuous operation of the timepieces. This imposes on the users of such timepieces an economic burden since the cells are expensive.

It has been proposed to provide a small electric generating device for charging a secondary cell used as the power source of a portable electronic device such as an electronic timepiece. However, such generating device has had serious disadvantages. Among such disadvantages are an inability to produce a sufficiently high electromotive force to charge the secondary cell, high friction losses and poor endurance.

SUMMARY OF INVENTION

It is an object of the present invention to provide a portable generating device eliminating the disadvantages of conventional generating devices. In particular it is an object of this invention to provide a portable generating device which effectively generates a high electromotive force which reduces friction and has good endurance.

In accordance with the invention the generating device comprises an oscillatable weight rotatably supported for rotation in either direction by changes in position of the device, rotation converting means for converting the oscillation of the oscillatable weight into rotation in one direction and a rotatably supported energy storing wheel comprising an input portion driven by the rotation converting means, an output portion and elastic means connecting the input and output portions. Means is provided for restraining the rotation of the output portion of the energy storing wheel until predetermined energy has been stored in the elastic means and then releasing the output portion. The kinetic energy generated by the energy storing wheel is converted into electric energy by impact with a piezoelectric element and such electric energy is used to charge a secondary cell serving as a power source for the electronic device.

BRIEF DESCRIPTION OF THE DRAWINGS

The nature, object and advantages of the invention will be more fully understood from the following description in conjunction with the accompanying drawings in which.

DESCRIPTION OF PRIOR ART

Figure 1:
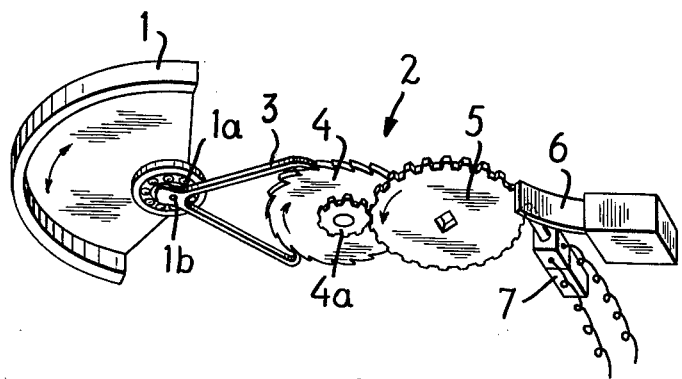
FIG. 1 is a schematic perspective view of a conventional generating device.

A conventional generating device as shown by way of example in FIG. 1 comprises an oscillatable weight 1 rotatably supported by a ball bearing 1a and rotatable in either direction by changes in the position of the device. A rotation converting mechanism 2 for converting the oscillatory movement of the weight 1 into rotational movement in one direction includes a two-arm pawl lever 3 connected with the oscillatable weight by an eccentric pin 1b and a ratchet wheel 4. A pinion 4a on the ratchet wheel 4 drives a ratchet wheel 5. A hammer 6 operated by the teeth of the ratchet wheel 5 hammers a piezoelectric element 7 so as to generate an electromotive force.

The hammer 6 is made of elastic material such as a spring and is arranged so that the tip of the hammer engages with the teeth of the ratchet wheel 5 as the ratchet wheel is rotated in a counterclockwise direction by the rotation converting mechanism 2. As the ratchet wheel 5 is rotated the teeth of the ratchet wheel engage the hammer 6 so as to flex it. When the hammer is released by a tooth the restoring force derived from the elasticity of the hammer causes the hammer to strike the piezoelectric element 7 and thereby generate an electromotive force.

However, the hammer 6 cannot store enough kinetic energy since the flexure of the hammer is very small. In general the electromotive force generated by the piezoelectric element is proportional to the impinging force applied to the piezoelectric element. Thus the electromotive force generated by the piezoelectric element increases if the impinging force applied to it increases and conversely the electromotive force decreases if the impinging force decreases.

If the generating device is used to charge a secondary cell the electromotive force which is generated by the generating device must be above a predetermined level in order to charge the cell. With a generating device of the kind illustrated in FIG. 1 it is difficult to obtain an electromotive force of a sufficiently high level to charge a secondary cell. Moreover, the endurance of the ratchet wheel 5 is poor because of the high friction loss. A generating device of the kind illustrated in FIG. 1 is thus subject to the disadvantages of generating an insufficient electromotive force and having high friction loss and poor endurance.

DESCRIPTION OF PREFERRED EMBODIMENTS

Figure 2:
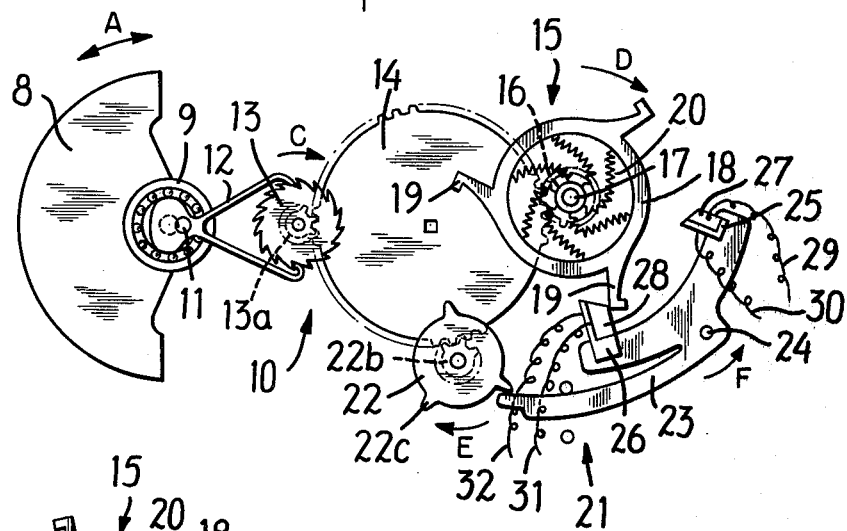
FIG. 2 is an enlarged schematic plan view showing an electric generating device in accordance with the present invention.
Figure 3:
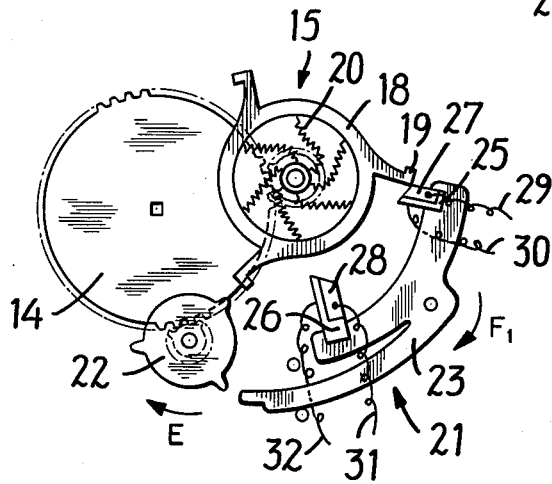
FIG. 3 is a schematic plan view corresponding to a portion of FIG. 2 but showing the parts in a different operative position.

The foregoing disadvantages are overcome by the portable electric generating device of the present invention a preferred embodiment of which is illustrated schematically in FIGS. 2 and 3. In this embodiment an eccentric oscillatable weight is rotatably supported by a ball bearing 9 so as to be rotated in either direction by changes in the position of the device in the manner of the oscillatable weight of a selfwinding watch. A rotation converting mechanism 10 converts the oscillation of the oscillatable weight 8 into rotation in one direction.

The rotation converting mechanism 10 is shown as comprising a two-arm pawl lever 12 connected with the oscillatable weight 8 by means of an eccentric pin 11 fixed on the oscillatable weight so that the two-arm pawl lever 12 is actuated by oscillation of the weight 8. The two-arms of the pawl engage opposite sides of a ratchet wheel 13 in such manner that the ratchet wheel is rotated in one direction by oscillation of the weight 8. A pinion 13a on the ratchet wheel 13 engages an intermediate gear wheel 14 so that the intermediate wheel 14 is driven by the ratchet wheel 13.

The intermediate wheel 14 of the rotation converting mechanism 10 drives the escape wheel 15 which functions as an energy storing wheel. The escape wheel 15 functioning as an energy storing wheel comprises an inner portion 17 fixed on a pinion 16 which engages with the intermediate wheel 14, a rim portion 18 having thereon a plurality of circumferentially spaced teeth 19 and a plurality of springs 20 serving as the energy storing means connected between the inner portion 17 and the rim portion 18.

The escape wheel 15 serving as an energy storing wheel is controlled so as to rotate incrementally by a control device 21. The control device 21 comprises a cam wheel 22 having a plurality of circumferentially spaced teeth 22c and fixed to a pinion 22b which engages with the intermediate wheel 14 of the rotation converting mechanism 10. The control device 21 further comprises a pallet 23 which is rotatably supported by a pallet staff 24 so as to move freely about the axis of the pallet staff as a center of rotation.

The pallet 23 has pawls 25 and 26 which are engageable with the escape teeth 19 of the escpae 15. The pawl 25 is formed as a short pawl while the pawl 26 is formed as a long pawl.

Piezoelectric elements 27, 28 made for example of PZT (Titanic acid lead zirconate), barium titanate and the like are disposed on the tips of the pawls 25 and 26. Lead wires 29 and 30 are connected with piezoelectric element 27 while lead wires 31 and 32 are connected with piezoelectric element 28. The pallet 23, as thus described, is movable freely by the cam 22 and the escape wheel teeth 19.

The operation of the portable electric generating device constructed as above will now be described with reference to FIGS. 2 and 3.

When the position of the portable electric generating device is changed, the oscillatable weight 8 is driven in a clockwise direction or in a counterclockwise direction, as indicated by the arrow A in FIG. 2. Through the connection provided by the eccentric pin 11, the oscillatable weight 8 actuates the two-arm pawl lever 12 of the rotation converting mechanism 10. By reason of the direction of the teeth on ratchet wheel 13 and the arrangement of the two arms of the pawl lever 12, the ratchet wheel 13 is driven in one direction, as indicated by the arrow C, regardless of the direction of oscillation of the eccentric weight.

Through the intermediate gear wheel 14, the ratchet wheel 13 drives the hub or input portion 17 of the energy storing wheel 15 but the rim or output portion 18 of the energy storing wheel 15 is maintained in a stopped state because the pawl 26 of the pallet 23 is in engagement with the escape tooth 19 of the escape wheel 15. Accordingly, the springs 20 connected between the hub portion 17 and the rim portion 18 of the energy storing wheel 15 are deformed elastically so as to store the kinetic energy transmitted to the energy storing wheel 15 by the rotation converting mechanism 10.

Upon further rotation of the intermediate gear wheel 14 a tooth 22c of the cam wheel 22, driven by the intermediate gear wheel 14 in the direction of the arrow E, engages the pallet 23 so as to turn it about the axis of the pallet staff 24 from the position shown in FIG. 2 to the position shown in FIG. 3. The tooth 19 of the escape wheel which has been retained by the pawl 26 is thereby released so that the rim portion 18 of the escape wheel is rotated rapidly in the direction of the arrow D by the elastic force of the springs 20 whereupon the next tooth 19 of the escape wheel strikes the short pawl 25, as illustrated in FIG. 3.

The piezoelectric element 27 is disposed on the short pawl 25 of the pallet 23 so as to be struck by the escape wheel tooth 19. Accordingly, the piezoelectric element 27 generates a high electromotive force.

As illustrated in FIG. 3 the escape wheel tooth 19 strikes the inclined chip face of the piezoelectric element 27 disposed on the short pawl 25 of the pallet 23. Accordingly, the pallet 23 is moved freely in the direction of the arrow $F_1$ so that it is returned to the position shown in FIG. 2 because the tip portion of the piezoelectric element 27 is pushed by the escape wheel tooth 19.

As a result the escape wheel tooth 19 is rotated further by the kinetic energy stored in the springs 20 serving as the energy storing means whereby it strikes the piezoelectric element 28 secured on the long pawl 26 of the pallet 23. The impact of the escape wheel tooth 19 on the piezoelectric element 23 generates a further high electromotive force.

Thus with the construction illustrated in FIGS. 2 and 3 a high electromotive force is effectively generated alternately by the piezoelectric elements 27 and 28 secured on the respective pawls 25 and 26 of the pallet 23. As the intermediate wheel 19 continues to be driven by oscillation of the eccentric weight 8 through the rotation converting mechanism, the operation described above is continually repeated.

Figure 4:
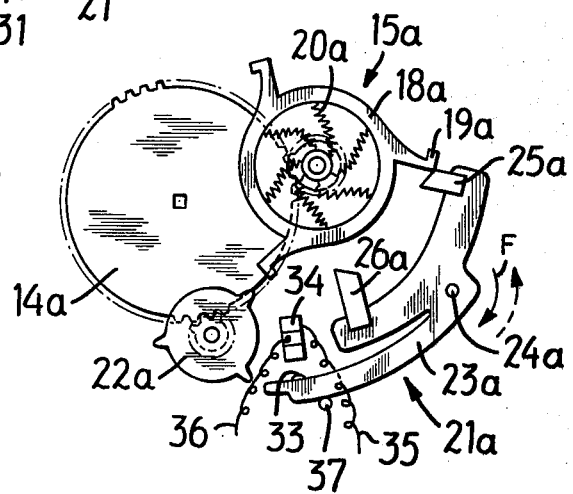
FIG. 4 is an enlarged schematic plan view similar to FIG. 3 but showing a modification.

Another embodiment of a portable electric generating device in accordance with the present invention is illustrated in FIG. 4 in which corresponding parts are designated by the same reference numerals as in FIGS. 2 and 3 with the addition of the suffix "a". The embodiment shown in FIG. 4 differs from that of FIGS. 2 and 3 in that the piezoelectric element is hammered by the pallet rather than by the teeth of the escape wheel.

The control device 21a which controls the intermittent rotation of the escape wheel 15a serving as the energy storing wheel comprises a pallet 23a serving as the control member and moving freely about its pivotal axis provided by the pallet staff 24a. The pallet 23a has a short pawl 25a and a long pawl 26a engageable with the escape wheel teeth 19a of the escape wheel 15a and has a tip portion engageable by the teeth of a cam wheel 22a driven by the intermediate gear wheel 14a. The pallet 23a is freely rotatable by the action of the cam wheel 22a engaging the tip portion of the pallet and the action of the teeth 19a of the escape wheel 15a engaging the pawls 25a and 26a as described above.

A piezoelectric element 34 is mounted at one side of the pallet 23a in position to be hammered by a projecting portion 33 on one side of the pallet 23a. A stopping pin 37 is disposed at the opposite side of the pallet 23a. The piezoelectric element 34 is connected to lead wires 35 and 36.

In the portable electric generating device illustrated in FIG. 4 the escape wheel 15a serving as the energy storing wheel and the pallet 23a serving as the control member operate in the same manner as described above with respect to FIGS. 2 and 3. The rim portion 18a of the escape wheel 15a is rotated by the kinetic energy stored in the springs 20a serving as the energy storing member, as shown in FIG. 4, when the escape wheel is released by the pallet 23a. The pallet 23a is moved freely and strongly in the direction of the arrow F when the escape wheel tooth 19a strikes the inclined tip portion of the short pawl 25a of the pallet 23a. Accordingly, the projecting portion 33 of the pallet 23a impinges strongly on the piezoelectric element 34. As a result the piezoelectric element 34 generates a high electromotive force.

In the embodiment illustrated in FIG. 4 a piezoelectric element is disposed on only one side of the pallet 23a. However, if desired piezoelectric elements may disposed on both sides of the pallet 23a.

In the embodiments described above the kinetic energy stored in the escape wheel serving as the energy storing wheel is of a considerable quantity. Accordingly, effective transmission is attained if the intermediate wheels 14, 14a are made as ratchet wheels.

If the portable electric generating device as described is assembled in an electronic wristwatch, the springs 20, 20a of the energy storing wheel 15, 15a may store the rotational energy of the oscillatable weight 8 because the user rotates the weight 8 at every movement of his wrist. As the piezoelectric elements 27, 28 and 34 are hammered strongly by the stored energy a high electromotive force is effectively produced.

The relation between the respective escape wheels 15, 15a and the respective pallets 23, 23a serving as the control members of the respective control devices 21, 21a are fundamentally similar with the escape mechanism of a mechanical wristwatch. The mechanism is thus relatively simple while at the same time being reliable and durable.

Figure 5:
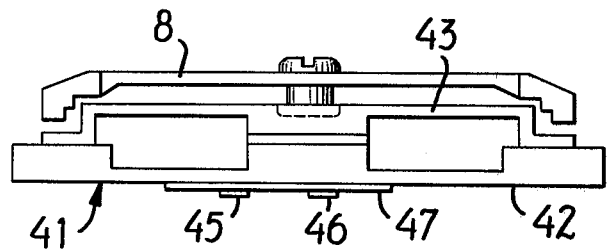
FIG. 5 is an enlarged schematic sectional view of a portable electric generating device in accordance with the present invention used in an electronic timepiece.
Figure 6:
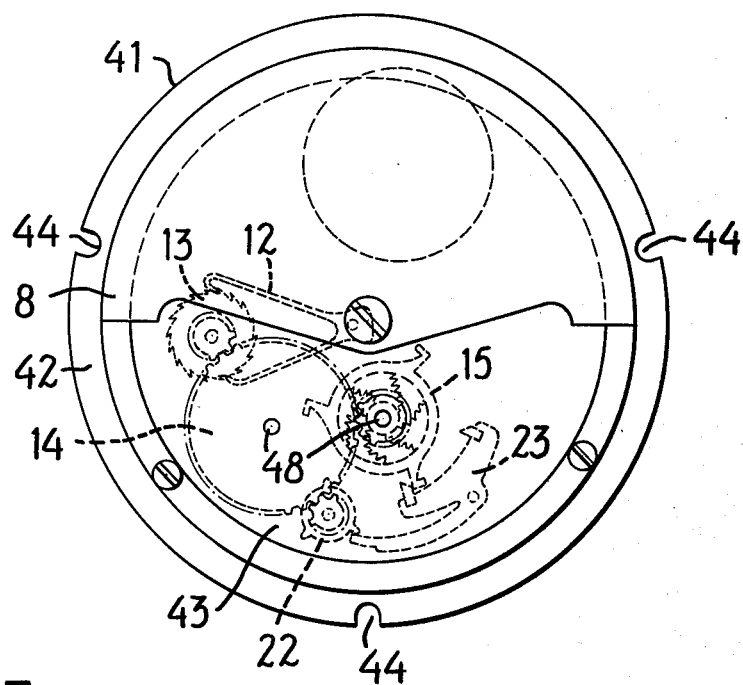
FIG. 6 is a schematic plan view of the portable electric generating device shown in FIG. 5.

FIGS. 5 and 6 illustrate a configuration of the portable electric generating device of the present invention suitable for incorporation in a wristwatch. A supporting case 41 is composed of a circular lower plate 42 and an upper plate 43. The lower plate 42 of the supporting case 41 has a pluarlity of recesses 44 for mounting the supporting case 41 in a watch case. On the bottom surface of the lower plate 41 output terminals 44 and 46 are provided on an insulating member 47.

The oscillatable weight 8 is rotatably mounted on the upper plate 43 and the two-arm pawl 12, ratchet wheel 13, intermediate wheel 14, energy storing escape wheel 15, cam wheel 22 and pallet 23 are arranged as illustrated in FIG. 6.

Figure 7:
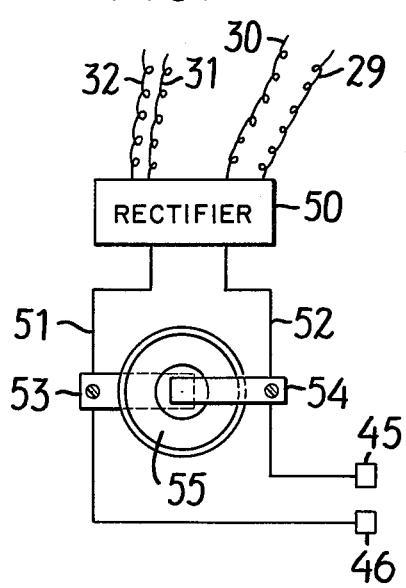
FIG. 7 is a circuit diagram showing the power supply of an electronic timepiece using the generating device as shown in FIGS. 2 and 3.

FIG. 7 is a circuit block diagram illustrating the electrical connections of the piezoelectric elements 27 and 28. The lead wires 29, 30, 31 and 32 of the generating device as shown in FIG. 2 are connected to the input terminals of a rectifier 50. The output terminals of the rectifier are connected by leads 51 and 52 to the output terminals 45 and 46, shown in FIGS. 5 and 7. Also the output lead wires 51 and 52 of the rectifier are connected to the leads 53 and 54 of a secondary cell 55. Thus the rectified output of the piezoelectric elements 27 and 28 is supplied to the output terminals 44 and 45 and also supplied to recharge the secondary cell 55. It will be understood that with the embodiment of FIG. 4 the lead wires 35 and 36 would similarly be connected with the input terminals of the rectifier 50, the circuitry of FIG. 7 being otherwise the same.

Figure 8:
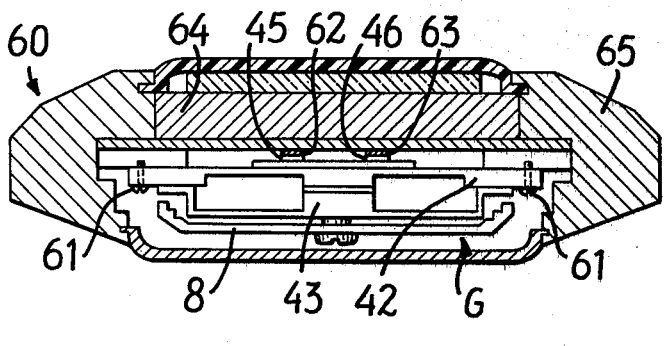
FIG. 8 is a schematic sectional view of an electronic watch in which is mounted a portable electric generating device as shown in FIGS. 5 and 6.

FIG. 8 is a sectional view of an electronic watch in which a portable electric generating device as shown in FIGS. 5, 6 and 7 constitutes the power supply. The portable electric generating device G is assembled in the case 65 of the electronic timepiece 60. The portable electric generating device G is mounted in the case by means of screws 61 in the recesses 44 of the lower plate 42.

The output terminals 45 and 46 of the portable electric generating device G contact terminals 62 and 63 which are disposed in the inner portion of the electronic wristwatch 60 and are connected to the timepiece circuit 64 serving as the load. Thus the portable electric generating device G connected with the output terminals 45 and 46 as illustrated in FIG. 7 serves as the power supply of the electronic timepiece 60.

While a preferred embodiment of the invention has been described in specific terms with reference to the accompanying drawings such description is for illustrative purpose only it being understood that changes and variations may be made. For example the energy storing means of the energy storing wheel may be made of piano wire, leaf springs, rubber, synthetic resin or the like. Also the configuration and structure of the oscillatable weight and the rotation converting mechanism may be changed and varied.

If the energy storing means of the energy storing wheel uses as the elastic means spring members such as coiled springs, leaf springs, piano wire or the like, the energy storing member does not vary or deteriorate or age and is able to be used in a steady state during a long period of time.

The good aging characteristics of the energy storing member can be attained effectively if the energy storing member uses a spring barrel such as is used in a self-winding wristwatch and having the main spring if the energy storing member is constructed in one piece with the intermediate wheel and the engagement between the cam wheel and intermediate wheel is improved.

The battery life and electric power is considerably improved if a silver oxide cell of high capacity or silver peroxide cell is used.

As will be understood from the construction as described above the portable electric generating device according to the present invention consists of an oscillatable weight to be rotated by changes in the position of the device, a rotation converting mechanism converting the oscillation of the oscillatable weight to rotation in one direction, an energy storing wheel driven by the rotation converting mechanism and control means permitting intermittent movement of the output portion of the energy storing wheel in such manner that one or more piezoelectric elements are hammered strongly by the rotational energy stored in the energy storing member.

In accordance with the invention the piezoelectric element or elements are hammered with a strong force so that the portable electric generating device is able to generate a high electromotive force which is adequate to drive a portable electronic device such as a wristwatch and to charge a secondary cell.

The portable electric generating device according to this invention has the further advantage that the friction in the mechanism is decreased and effectiveness, reliability and endurance are increased. Thus the portable electric generating device in accordance with the invention has been found to be highly effective and advantageous in practice.

What is claimed is:

1. A portable electric generating device comprising an oscillatable weight rotatably supported for rotation in either direction by changes in position of said device, rotation converting means for converting oscillation of said oscillatable weight into rotation in one direction, a rotatably supported energy storing wheel comprising an input portion driven by said rotation converting means, an output portion and elastic means connecting said input and output portions, control means for restraining rotation of said output portion of said energy storing wheel until predetermined energy has been stored in said elastic means and then releasing said output portion, a piezoelectric element, and means energized by rotation of said output portion of said energy storing wheel to strike said piezoelectric element and thereby generate electrical energy.

2. A portable electric generating device according to claim 1, in which said means for sriking said piezoelectric element comprises at least one tooth on said output portion of said energy storing wheel.

3. A portable electric generating device according to claim 2, in which said control means comprises a pallet having pawls engageable with said tooth of said output portion of said energy storing wheel.

4. A portable electric generating device according to claim 3, in which said piezoelectric element is disposed on at least one of said pawls in position to be struck by said tooth.

5. A portable electric generating device according to claim 3, in which said piezoelectric element is mounted in position to be struck by said pawl.

6. A portable electric generating device according to claim 3, in which said control means further comprises a cam wheel driven by said rotation converting means and having cam means for actuating said pallet.

7. A portable electric generating device according to claim 1, in which said energy storing wheel comprises a barrel drum having a hub portion driven by said rotation converting means, a rim portion coaxial with said hub portion and spring means connecting said hub portion with said rim portion.

8. A power supply for an electronic watch having a case, comprising a portable generating device mounted in said watch case and comprising an eccentric weight rotatably supported for oscillation by changes in position of said watch, rotation converting means for converting oscillation of said weight into rotary movement in one direction, a rotatably supported energy storing wheel comprising an input portion driven by said rotation converting means, an output portion and elastic means connecting said input and output portions, control means for restraining rotation of said output portion of said energy storing wheel until predetermined energy has been stored in said elastic means and then releasing said output portion, a piezoelectric element, means energized by rotation of said output portion of said energy storing wheel upon release by said control means to strike said piezoelectric element and thereby generate electric current, means connected with said piezoelectric element for rectifying said current, a secondary electric cell and means for connecting said rectifying means with said cell to charge said cell.

9. A power supply according to claim 8, in which said energy storing wheel comprises a barrel drum comprising a hub portion driven by said rotation converting means, a rim portion coaxial with said hub portion and having circumferentially spaced teeth thereon, and spring means connecting said hub portion with said rim portion.

10. A power supply according to claim 9, in which said control means comprises a pallet having pawls engageable with said teeth of said energy storing wheel.

11. A power supply according to claim 10, in which said piezoelectric element is mounted on a pawl of said pallet in position to be struck by said teeth of said energy storing wheel.

12. A power supply according to claim 10, in which said piezoelectric element is mounted in position to be struck by said pallet.

13. A power supply according to claim 10, in which said control means further comprises a cam wheel driven by said rotation converting means and having cam means for actuating said pallet.

* * * * *